(12) United States Patent
Vaughn et al.

(10) Patent No.: US 11,209,030 B2
(45) Date of Patent: Dec. 28, 2021

(54) SIX WAY BUNDLE FLANGE MOUNT

(71) Applicant: HellermannTyton Corporation, Milwaukee, WI (US)

(72) Inventors: Reese L. Vaughn, Milwaukee, WI (US); Justin Gallion, Milwaukee, WI (US); Christopher J. Rohde, West Allis, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

(21) Appl. No.: 16/633,378

(22) PCT Filed: Jul. 24, 2018

(86) PCT No.: PCT/US2018/043402
§ 371 (c)(1),
(2) Date: Jan. 23, 2020

(87) PCT Pub. No.: WO2019/032276
PCT Pub. Date: Feb. 14, 2019

(65) Prior Publication Data
US 2020/0232489 A1    Jul. 23, 2020

Related U.S. Application Data

(60) Provisional application No. 62/542,930, filed on Aug. 9, 2017.

(51) Int. Cl.
| F16M 11/00 | (2006.01) |
| F16B 2/14  | (2006.01) |
| F16B 47/00 | (2006.01) |

(52) U.S. Cl.
CPC .............. *F16B 2/14* (2013.01); *F16B 47/003* (2013.01)

(58) Field of Classification Search
None
See application file for complete search history.

(56) References Cited

U.S. PATENT DOCUMENTS

| 4,953,820 A | 9/1990 | Yoder |
| 5,337,983 A | 8/1994 | Mailey |
(Continued)

FOREIGN PATENT DOCUMENTS

| CN | 104595298 A1 | 5/2015 |
| DE | 202005019375 U1 | 3/2006 |
(Continued)

OTHER PUBLICATIONS

"International Preliminary Report on Patentability", Application No. PCT/US2018/043402, dated Feb. 11, 2020, 7 pages.
(Continued)

*Primary Examiner* — Steven M Marsh
(74) *Attorney, Agent, or Firm* — Colby Nipper PLLC

(57) ABSTRACT

A fastener assembly includes a clamp body six channels extending therethrough configured to permit a cable tie or strap to be passed therethrough. A first channel is coplanar with and perpendicular to a second channel. A third channel is coplanar with and perpendicular to a fourth channel. A fifth channel is coplanar with and perpendicular to a sixth channel. The first and second channels are perpendicular to the third and fourth channels and parallel to the fifth and sixth channels. The fastener assembly includes a clamp body having an upper clamping arm, a lower ramp arm and a stress arm therebetween and a retaining segment slideably connected to the lower ramp arm. The lower ramp arm defines a pair of ramp ledges that are slideably received within a pair of wedge channels defined by the retaining segment.

9 Claims, 6 Drawing Sheets

(56) References Cited

U.S. PATENT DOCUMENTS

| | | | |
|---|---|---|---|
| 6,994,300 B2 | 2/2006 | Labeirie et al. | |
| 7,290,739 B2 | 11/2007 | Zeuner et al. | |
| 9,004,417 B2 | 4/2015 | Elsner et al. | |
| 10,631,472 B2* | 4/2020 | Clarke | F16M 13/022 |
| 10,876,658 B2* | 12/2020 | Sixsmith | F16L 3/243 |
| 2005/0204519 A1 | 9/2005 | Zeuner et al. | |
| 2007/0241249 A1* | 10/2007 | Ford | E06B 9/02 |
| | | | 248/220.21 |
| 2008/0229550 A1 | 9/2008 | Elsner | |
| 2009/0139156 A1 | 6/2009 | Magno, Jr. et al. | |
| 2011/0248131 A1* | 10/2011 | Genschorek | E04D 13/10 |
| | | | 248/220.22 |
| 2013/0149030 A1 | 6/2013 | Merhar et al. | |

FOREIGN PATENT DOCUMENTS

| | | |
|---|---|---|
| DE | 202006001743 U1 | 5/2006 |
| FR | 2601086 | 1/1988 |
| GB | 2024925 | 1/1980 |
| JP | 2008185988 A | 8/2008 |
| KR | 1020070052022 A | 5/2007 |

OTHER PUBLICATIONS

"International Search Report and Written Opinion", Application No. PCT/US2018/043402, dated Nov. 8, 2018, 8 pages.

"Extended European Search Report", EP Application No. 18843406.2, dated Mar. 17, 2021, 5 pages.

* cited by examiner

SIX WAY BUNDLE FLANGE MOUNT

CROSS-REFERENCE TO RELATED APPLICATION

This application is a national stage application under 35 U.S.C. § 371 of PCT Application Number PCT/US2018/043402 having an international filing date of Jul. 24, 2018, which designated the United States, said PCT application claiming the benefit of U.S. Provisional Patent Application No. 62/542,930 filed on Aug. 9, 2017, the entire disclosure of each which is hereby incorporated by reference.

TECHNICAL FIELD OF THE INVENTION

This application relates to the attachment of elongated articles, such as cables, hoses, wires or conduits, to a structural component such as a beam. More specifically, the application relates to a fastener for attachment to a beam flange that provides multiple channels for holding multiple articles with cable ties or straps.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
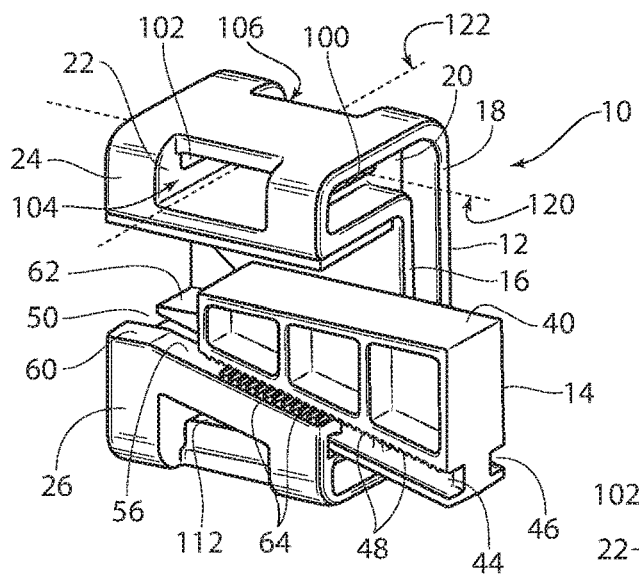
FIG. 1 is a right hand perspective view of a clamp according to a first embodiment of the present invention.
Figure 2:
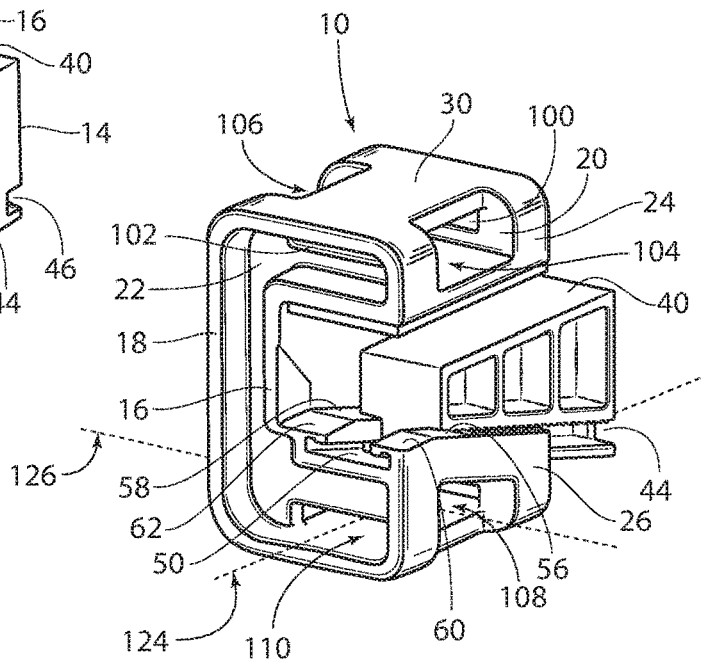
FIG. 2 is a left hand perspective view of the clamp shown in FIG. 1 according to the first embodiment of the present invention.
Figure 3:
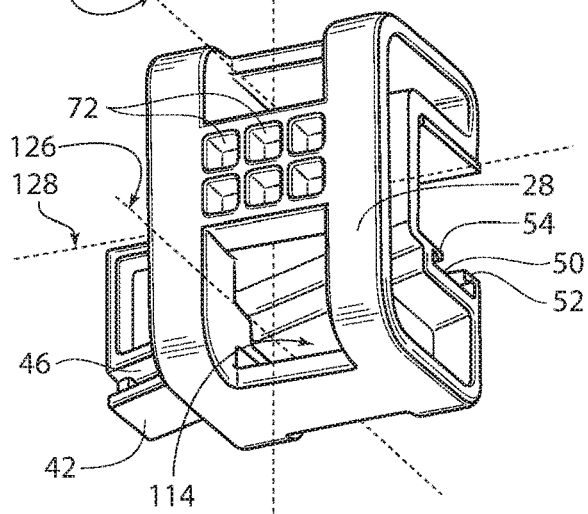
FIG. 3 is a bottom rear perspective view of the clamp shown in FIG. 1 according to the first embodiment of the present invention.
Figure 4:
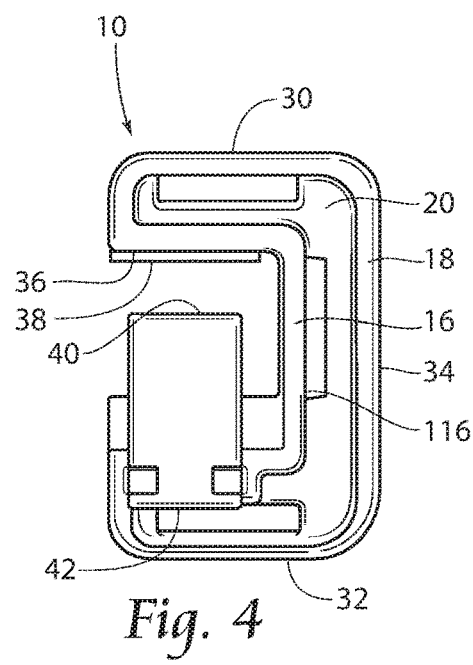
FIG. 4 is a side view of the clamp shown in FIG. 1 according to the first embodiment of the present invention.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIGS. 1-6 illustrate an example of a beam flange clamp, hereinafter referred to as the clamp 10 according to one embodiment of the invention which includes a clamp body 12 and a wedge-shaped retaining segment 14. The clamp body 12 has an inner C-shaped portion 16 surrounded by an outer C-shaped portion 18, with inner and outer C-shaped portions 16, 18 being integral with one another by way of a right wall 20 and a left wall 22. Inner C-shaped portion 16 has an upper clamping arm 24 and a lower ramp arm 26 connected by a stress arm 28. The outer C-shaped portion 18 has a top surface 30 adjacent the upper clamping arm 24, a bottom surface 32 adjacent the lower ramp arm 26, and rear surface 34 adjacent stress arm 28.

The upper clamping arm 24 has a lower clamping surface 36 for contacting an upper surface of a structure such as a beam B or a flange of a beam. The lower clamping surface 36 is provided with a gripping surface 38 which can be molded into lower clamping surface 36 or applied after construction of clamp 10.

The retaining segment 14 has an upper clamping surface 40 for contacting a lower surface of a structure such as a beam B, and a lower ramp surface 42 configured for slideable engagement with lower ramp arm 26 by way of a T-shaped rail defining a pair of wedge channels 44, 46. Wedge channels 44, 46 preferably bear a series of serrations 48 therein.

Figure 5:
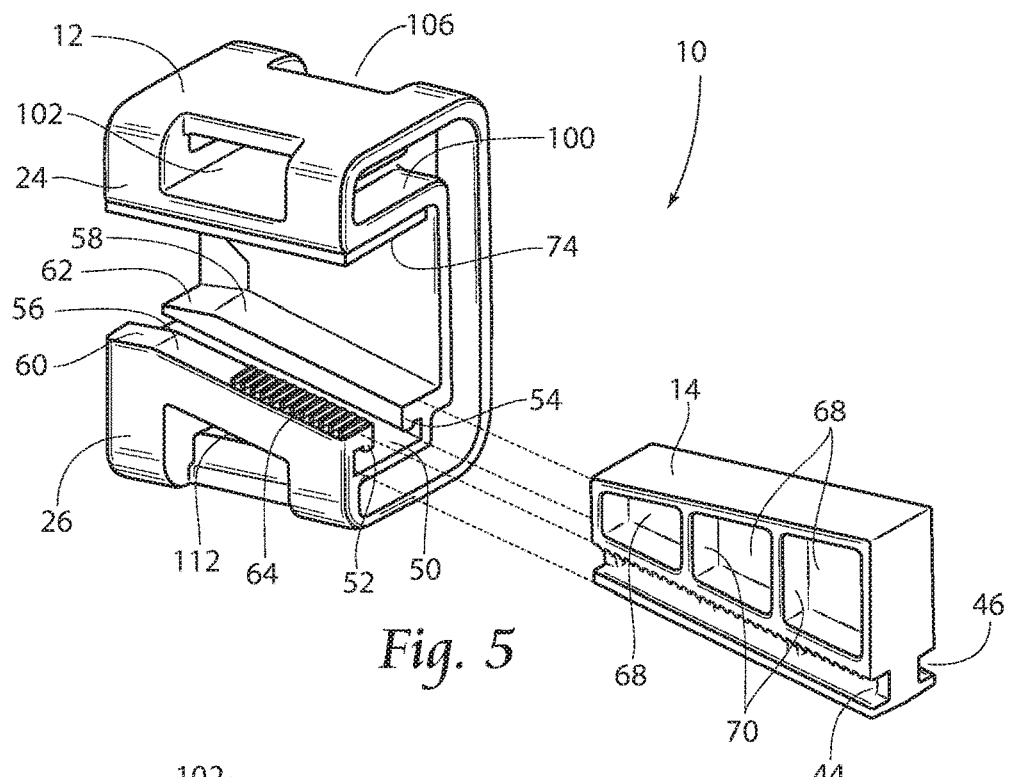
FIG. 5 is a perspective view of the clamp shown in FIG. 1 with a wedge retention segment shown removed from the body of the clamp according to the first embodiment of the present invention.

As best seen in FIG. 5, the lower ramp arm 26 has a ramp channel 50 configured to accept wedge channels 44, 46. The ramp channel 50 has ramp ledges 52, 54 on either side, each of which has an upper ramp surface 56, 58 terminating at a ramp flat 60, 62. The ramp ledges 52, 54 are slideably received within wedge channels 44, 46. Either or both of upper ramp surfaces 56, 58 bear a series of serrations 64 corresponding to wedge channels 44, 46 for firm one-way sliding engagement of retaining segment 14 within lower ramp arm 26.

The upper clamping arm 24 and the lower ramp arm 26 are further provided with apertures there through. Specifically, the upper clamping arm 24 has a first aperture 100 through right wall 20 and a second aperture 102 through left wall 22, forming a transverse channel 120 therethrough. The upper clamping arm 24 is further provided with a third aperture 104 and a fourth aperture 106 forming a lateral channel 122.

Similarly, the lower ramp arm 26 has first, second, third, and fourth apertures 108, 110, 112, 114 forming a transverse channel 124 and a lateral channel 126 therethrough.

The stress arm 28 has a pair of apertures 116, 118 forming a transverse channel 128. Aperture 106 of the upper clamping arm 24 and aperture 108 of lower ramp arm 26 each extend through stress arm 28 creating a perpendicular channel 130 therethrough.

Figure 13:
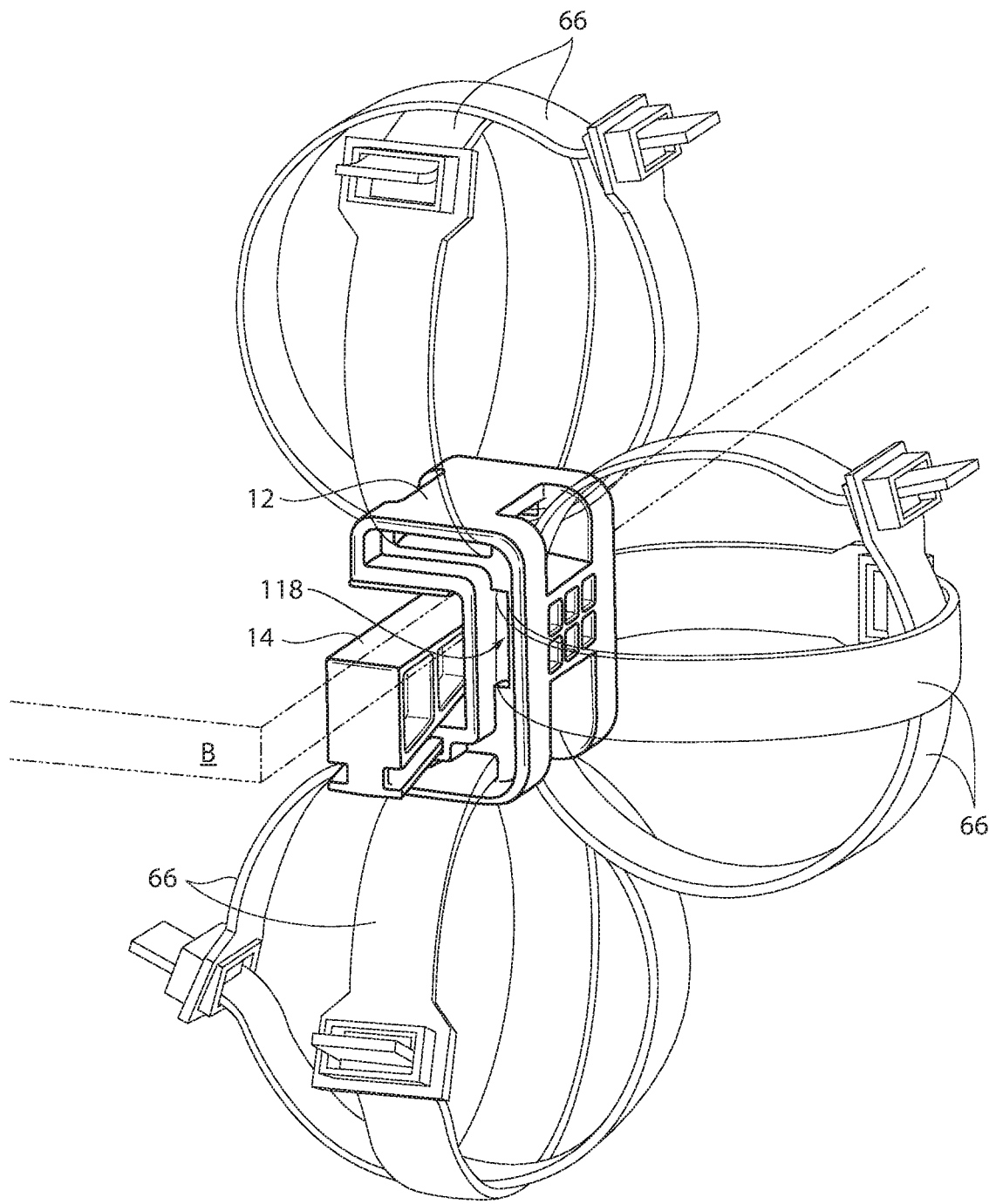
FIG. 13 is a right side top perspective view of the clamp being installed according to the first embodiment of the present invention.

Apertures 100 through 118 thus provide six separate channels 120 through 130 extending through the clamp 10 that are oriented in three mutually perpendicular planes along three mutually perpendicular axes, e.g., longitudinal, transverse and vertical axes. Each of the six channels 120-130 is configured to permit a cable tie or strap 66 to be passed therethrough. As seen in FIG. 13, this provides the user with maximum flexibility in placing a strap or straps 66 according to the orientation of the cables to be bundled.

Figure 6:
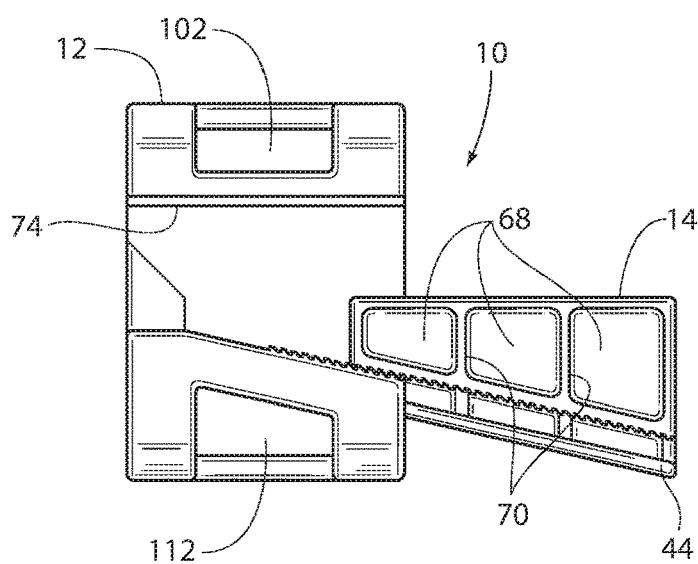
FIG. 6 is a front view of the clamp shown in FIG. 1 in connection with a side view of a first embodiment of a wedge segment according to the first embodiment of the present invention.
Figure 7:
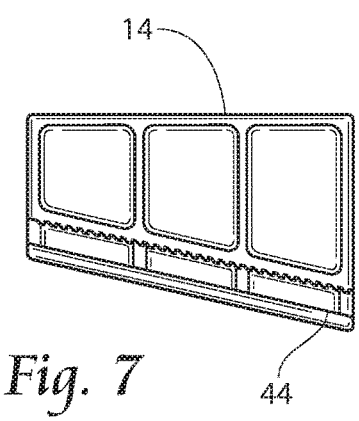
FIG. 7 is a side view of a wedge segment according to a second embodiment of the present invention.
Figure 8:
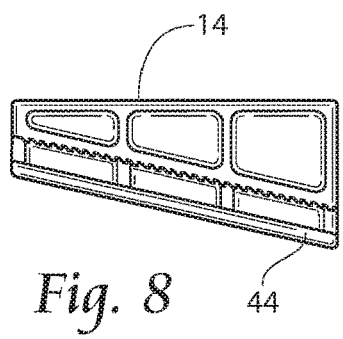
FIG. 8 is a side view of a wedge segment according to a third embodiment of the present invention.

As illustrated in FIGS. 6-8, the retaining segment 14 may be provided in multiple sizes for use with differently sized work pieces. A relatively thin beam B would require a thicker retaining segment 14 to best hold the clamp 10 into clamping connection, while a clamp 10 would best be held into clamping connection with a relatively thick work piece by using a thinner retaining segment 14. In this way, a single clamp 10 can be used on multiple structures by selecting an appropriately sized retaining segment 14.

As can further be seen in FIGS. 6-8, the wedge segments are preferably constructed with openings 68 separated by struts 70, with openings 68 designed to reduce material costs and total weight, and struts 70 designed to support clamping along the length of retaining segment 14.

Referring back to FIG. 3, the stress arm 28 of outer C-shaped portion 18 preferably has pockets 72 formed therein. The pockets 72 are designed to reduce material costs and total weight of clamp 10, but also provide a degree of flexibility to stress arm 28 to compensate for potential over-clamping forces that could otherwise cause the clamp 10 to fail.

Figure 9:
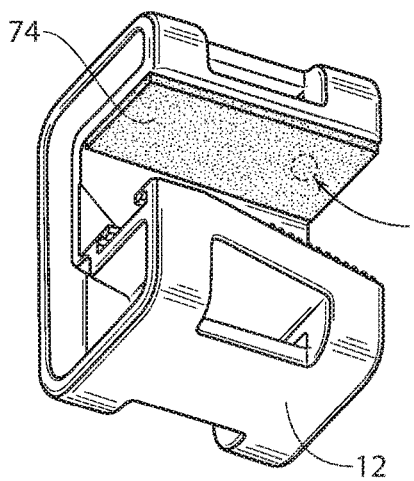
FIG. 9 is a bottom left perspective view of the clamp shown in FIG. 1 showing the gripping surface of the clamping arm according to the first embodiment of the present invention.
Figure 10A:
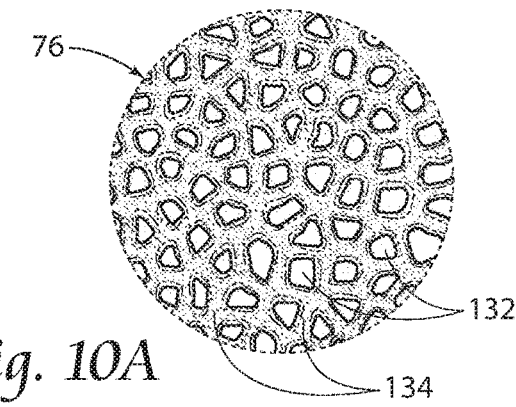
FIG. 10A is a microscope view of one embodiment of the gripping surface shown in FIG. 8 according to the third embodiment of the present invention.
Figure 10B:
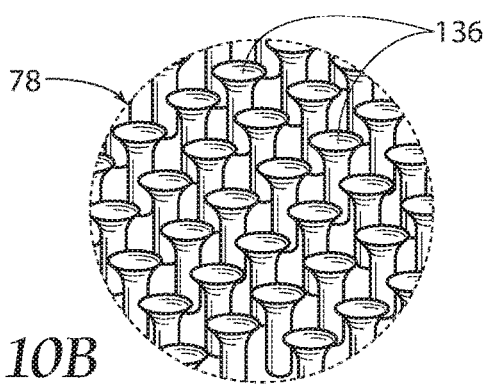
FIG. 10B is a microscope view of another embodiment of the gripping surface shown in FIG. 8 according to the third embodiment of the present invention.
Figure 11:
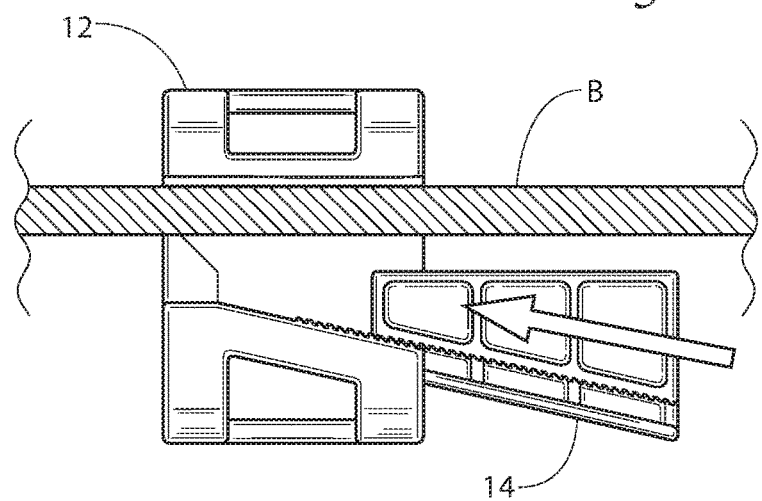
FIG. 11 is a front view of the clamp shown in FIG. 1 with the wedge segment being installed according to the first embodiment of the present invention.
Figure 12:
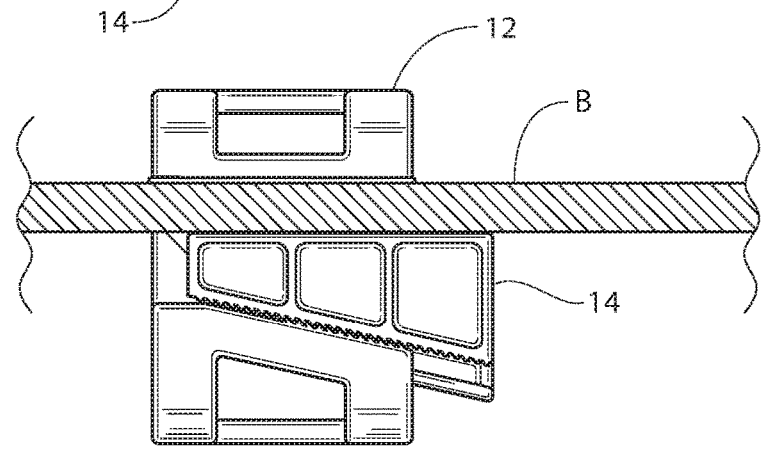
FIG. 12 is a front view of the clamp shown in FIG. 1 with the wedge segment installed according to the first embodiment of the present invention.

FIGS. 9-10B illustrate a preferred embodiment of lower clamping surface 36 of upper clamping arm 24, in which the lower clamping surface 36 comprises an adhesive. Use of molded grooves to provide frictional connection between a clamp and a surface to be clamped is known to be effective with soft surfaces or painted surfaces as these can grip the surface and prevent the clamp from loosening. Frictional rubber foam is also known for use with harder surfaces. However, in the present invention, as shown in FIG. 10A, it is envisioned that lower clamping surface 36 may comprise a "gecko" adhesive in which a plurality of microscopic bumps 132 have channels 134 there between, these channels 134 containing a pressure sensitive adhesive. Advantageously, in this embodiment the lower clamping surface 36 is non-adhesive until the microscopic bumps 132 are pressed flat by engagement with a surface, thus exposing the adhesive within channels 134 to the surface.

FIG. 10B illustrates another embodiment of a surface treatment in which micro-suction cups 136 are applied to the lower clamping surface 36. Micro-suction cups 136 provide a strong but non-adhesive bond between lower clamping surface 36 and a beam B.

In a preferred embodiment of clamp 10, each of apertures 100-118 are wide relative to the clamp body 12, thus creating relatively wide channels 120-130. This is advantageous in that wider channels distribute the load on a strap across more surface area; narrow retaining members for straps can more easily crease and chafe the straps over time and ultimately cause them to fail.

In another preferred embodiment of clamp 10, serrations 64 extend up upper ramp surfaces 56, 58 almost to or past the center of the upper ramp surfaces 56, 58, as seen in FIGS. 5 and 6. Extending serrations 64 in this way provides additional securing forces to prevent a retaining segment 14 from backing out of place under the stress of clamping forces.

Additional support for retention of retaining segment 14 is provided by lower ramp arm 26, which, because it extends the entire width of clamp 10, maintains pressure across the length of upper ramp surfaces 56, 58 under clamping stress.

Ramp flats 60, 62 are integrated into the clamp body 12 rather than protruding from clamp 10, producing a more streamlined product. Ramp flat 60 provides a surface within which the series of serrations 64 are formed. Both ramp flat 60 and ramp flat 62 provide a guide and support surface for the retaining segment 14 as wedge channels 44, 46 engage with ramp channel 50.

Figure 14:
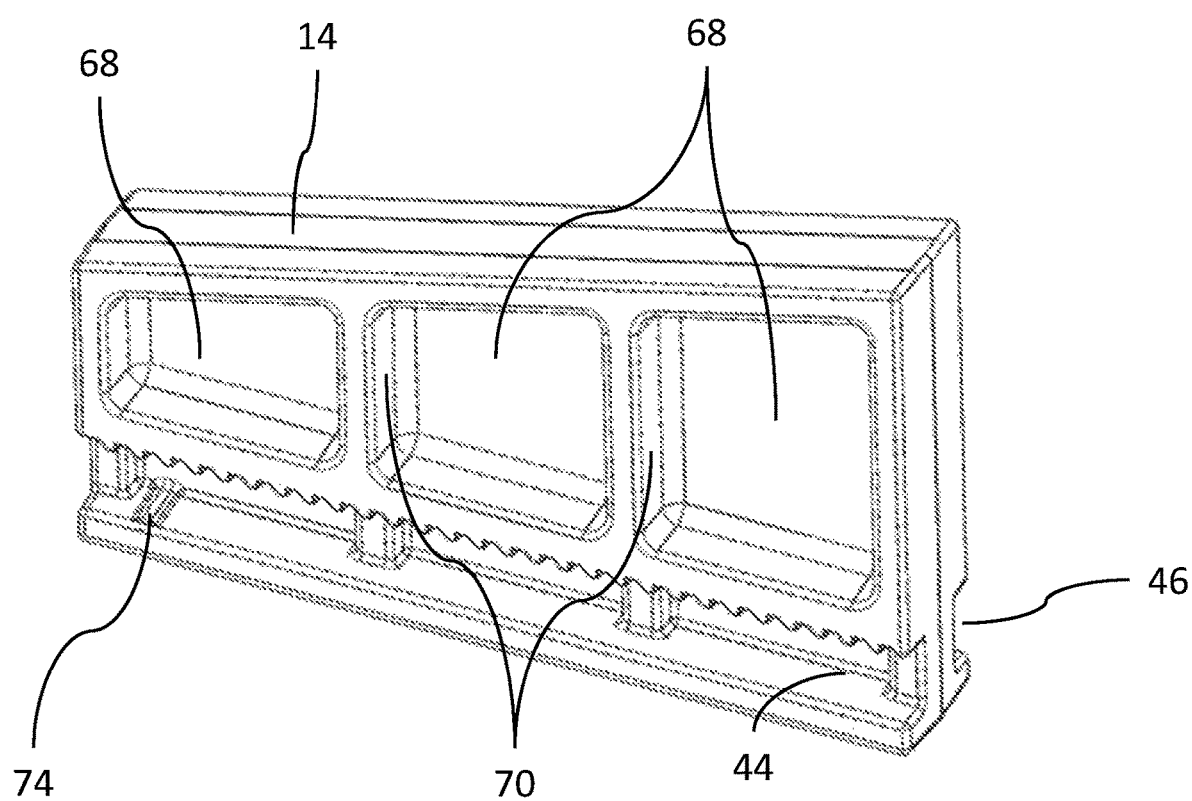
FIG. 14 is a perspective view of wedge segment according to the first embodiment of the present invention.

As illustrated in FIG. 14, the lower surface of the ramp channel 50 includes a protrusion 74 that is configured to provide contact, compression, and friction against the ramp ledge 52 to hold the retaining segment 14 in a preassembled position relative to the clamp 10 during shipping and handling.

Figure 15:
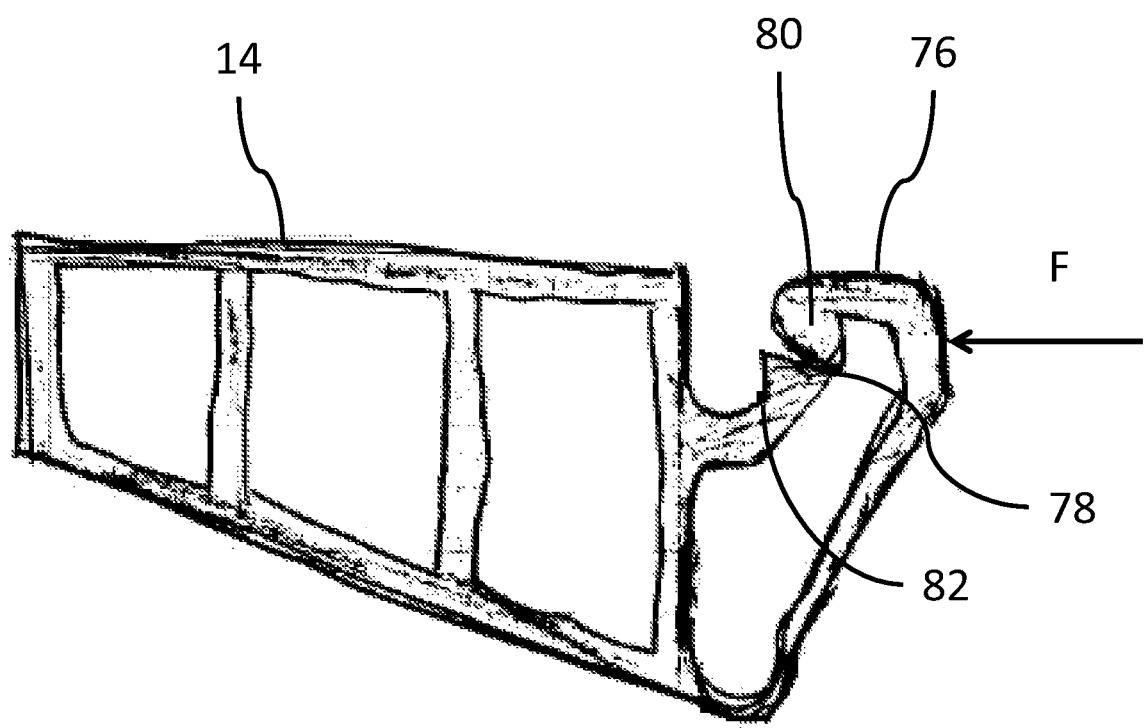
FIG. 15 is a side view of wedge segment according to a second embodiment of the present invention.

As illustrated in FIG. 15, the retaining segment 14 includes a snap feature 76 that provides a tactile "snap" sensation to the installer as a predetermined driving force F is exceeded. This feature provides the benefit of limiting the applied driving force F to protect the integrity of the clamp structure by preventing an excessive driving force that could damage the clamp structure. The snap feature 76 may have a frangible portion 78. As the applied driving force F is increased and exceeds the predetermined force threshold, the frangible portion 78 will break allowing the snap 80 to advance and engage the latch 82 which provides the tactile "snap" sensation to the Installer thereby warning the Installer to stop applying any further driving force F.

In prior art flange clamps, wedge segments have been designed to fit more or less "perfectly" within the clamp body. The segments have been sized to the size of the clamp body, and may even have a ramp stop and/or wedge stop to keep a wedge segment directly within the clamp body. However, this reduces the ability of the clamp to be adjusted to fit different beams with the same clamping force.

The present invention corrects and improves upon those deficiencies by providing a higher opening and longer ramp. For example, in a preferred embodiment, clamp 10 has an overall height of 43.08 mm, making it over 10% larger than prior art clamps. The increased clamp height allows for an increased opening between lower clamping surface 36 of upper clamping arm 24 and ramp flats 60, 62, which in the present embodiment is 15.39 mm, over 15% larger than previously observed in prior art designs. The total clamp width in this embodiment is 30.75 mm, creating at least a 20% longer ramp than previously provided.

Further, clamp 10 does not have a wedge stop that prevents a wedge segment from extending past the clamp body. This allows a wedge segment to extend past the edge of the clamp, thereby increasing the overall clamping range. Similarly, clamp 10 lacks a rear wall stop at the terminal end of wedge channels 44, 46, again allowing a wedge segment to extend past the clamp body and allowing a wider clamping range.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A fastener assembly, comprising:
a clamp body having an upper clamping arm, a lower ramp arm and a stress arm therebetween, wherein a lower clamping surface of the upper clamping arm is nonparallel to an upper ramp surface of the lower ramp arm, wherein the upper clamping arm defines a first channel and a second channel extending therethrough, said first channel is coplanar with the second channel, a first channel axis is perpendicular with a second channel axis, first and second channel axes are parallel to the lower clamping surface, wherein the stress arm defines a third channel and a fourth channel extending therethrough, said third channel is coplanar with the fourth channel, a third channel axis is perpendicular with a fourth channel axis, and the third and fourth channel axes are perpendicular to the lower clamping surface, and wherein the lower ramp arm defines a fifth channel and a sixth channel extending therethrough, said fifth channel is coplanar with the sixth channel; and
a retaining segment slideably connected to the lower ramp arm, said retaining segment having an upper clamping surface that is parallel to the lower clamping surface and having a lower ramp surface that is parallel with the upper ramp surface, wherein a fifth channel axis is perpendicular to a sixth channel axis and the fifth and sixth channel axes are parallel to the upper clamping surface and wherein the lower ramp arm defines a pair of ramp ledges that are slideably received within a pair of wedge channels defined by the retaining segment, wherein the pair of ramp ledges are parallel to the lower ramp surface and the pair of wedge channels are parallel to the upper ramp surface.

2. The fastener assembly according to claim 1, wherein the pair of ramp ledges and the pair of wedge channels define a plurality of serrations configured to provide firm one-way sliding engagement of the retaining segment with the lower ramp arm.

3. The fastener assembly according to claim 1, wherein the lower clamping surface includes an adhesive.

4. The fastener assembly according to claim 3, wherein the lower clamping surface defines a plurality of bumps with a plurality of channels formed therebetween and wherein the adhesive is disposed within the plurality of channels.

5. The fastener assembly according to claim 1, wherein the lower clamping surface defines a plurality of micro-suction cups.

6. The fastener assembly according to claim 1, wherein a lower surface of the pair of wedge channels each define a protrusion configured to contact the pair of ramp ledges, thereby holding the retaining segment in a preassembled position relative to the clamp body.

7. The fastener assembly according to claim 1, wherein the retaining segment defines a snap feature configured to provide a tactile "snap" sensation as a predetermined driving force threshold is exceeded.

8. The fastener assembly according to claim 7, wherein the snap feature defines a frangible portion configured to break when the driving force threshold is exceeded.

9. The fastener assembly according to claim 8, wherein the snap feature is configured to engage a latch feature after the frangible portion breaks when the driving force threshold is exceeded.

* * * * *